March 3, 1931.   T. V. BUCKWALTER   1,794,580
ROLLER BEARING CONSTRUCTION
Filed Oct. 11, 1928   2 Sheets-Sheet 1
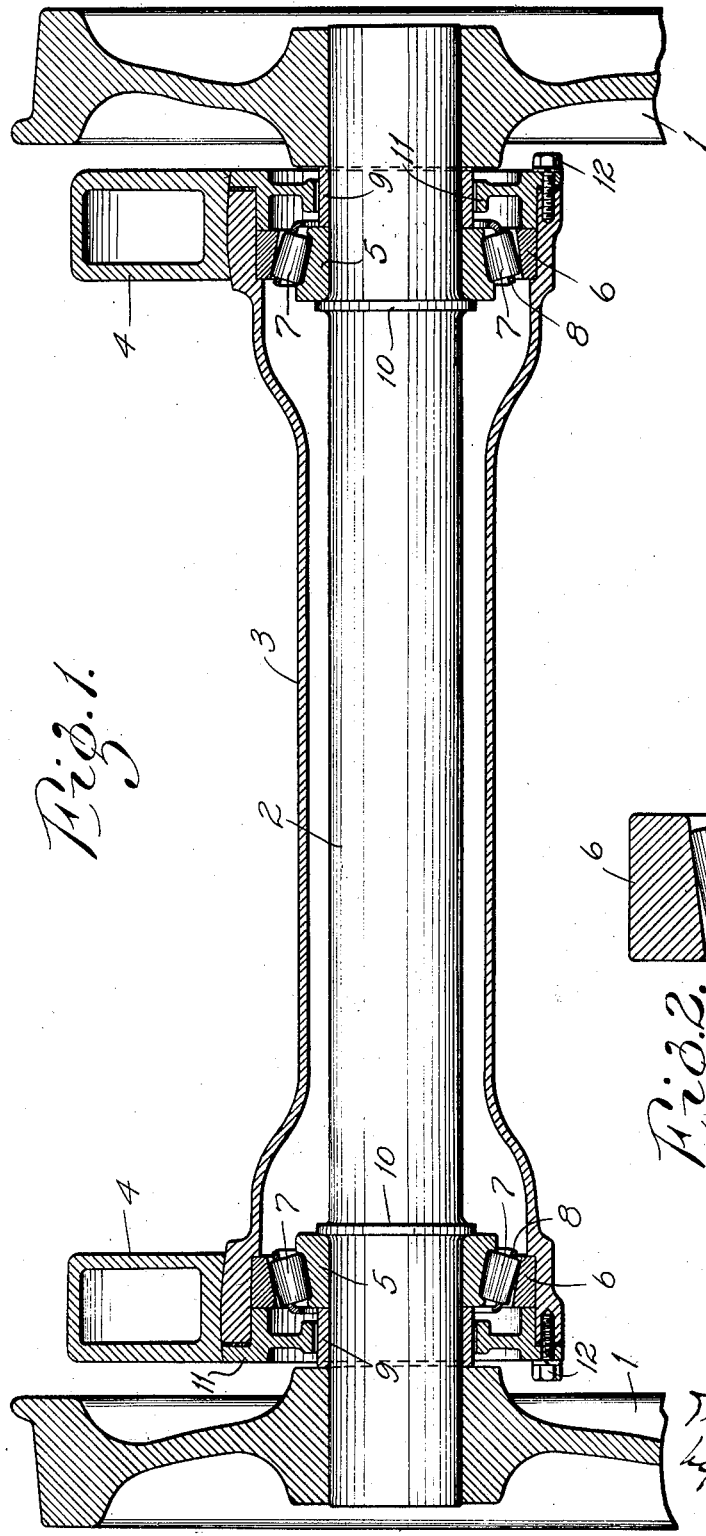
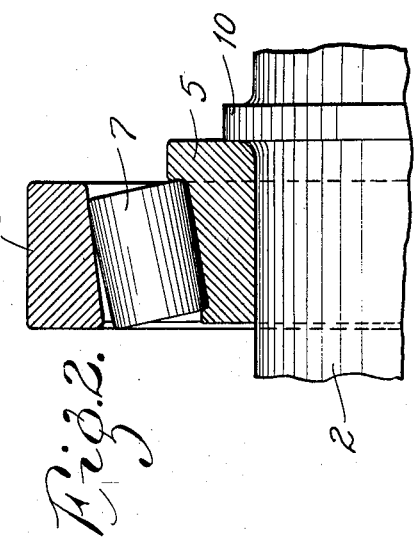
INVENTOR:
Tracy V. Buckwalter
by Bassett Bean & Gravely
HIS ATTORNEYS

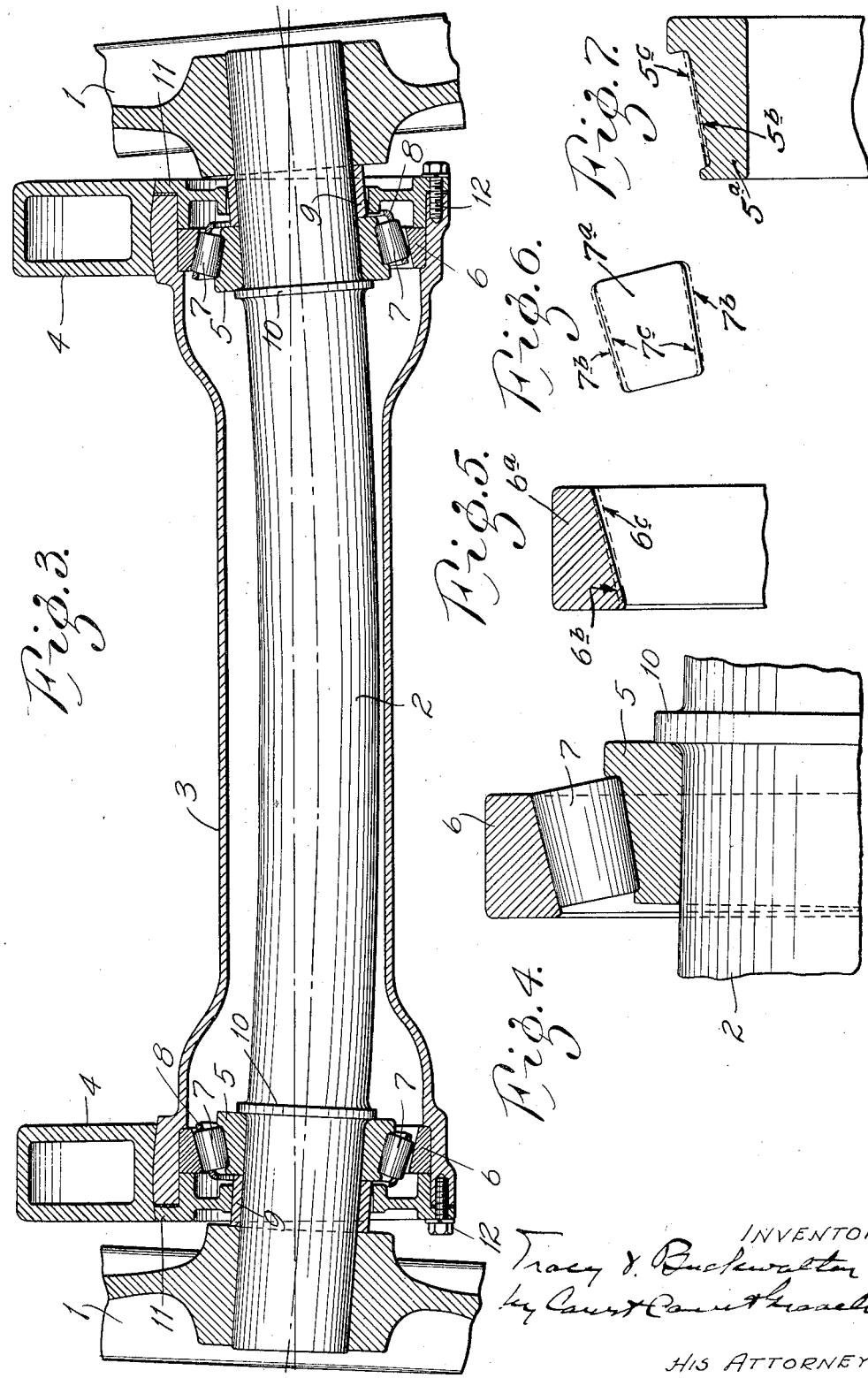

Patented Mar. 3, 1931

1,794,580

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

ROLLER-BEARING CONSTRUCTION

Application filed October 11, 1928. Serial No. 311,754.

My invention relates to roller bearing constructions intended for use on shafts that are subject to bending or deflection in service. The principal object of the invention is to insure line contact of the bearing rollers throughout their length with both the inner and the outer raceway members when the shaft is under load sufficient to deflect it. The invention consists principally in forming the parts of the bearing so that, when the inner and outer raceway members thereof are in true axial alinement and the rollers contact throughout their length with one of the raceway members, the rollers will contact with the other raceway member only at their ends and form such clearance angle therewith. When said axes are slightly inclined, the roller that is under load will have contact throughout its length with both the inner and the outer raceway members. The invention also consists in the construction and arrangement of parts hereinafter described and claimed.

In the accompanying drawing wherein like reference numerals refer to like parts wherever they occur, Fig. 1 is a vertical longitudinal sectional view of a railway axle construction conforming to my invention, the live axle or shaft being shown in elevation as a straight horizontal member, as it exists when the car is empty, the uppermost roller of each bearing being shown in contact with the cone throughout its length and in contact with the cup at one end only;

Fig. 2 is an enlarged sectional detail view of the upper portion of one of the bearings before the load is applied;

Fig. 3 is a view similar to Fig. 1, showing the shaft bent slightly downwardly, as it appears when the car is fully loaded, the uppermost roller of each bearing having line contact with both the cup and the cone;

Fig. 4 is an enlarged sectional detail view of the upper portion of one of the bearings after the load is applied.

Fig. 5 is an enlarged sectional detail view through the cup or outer bearing member of a standard tapered roller bearing, showing, in dotted lines, the manner in which the taper of the inside diameter of such bearing member may be modified to secure the desired clearance angle;

Fig. 6 is an enlarged side elevation view of one of the tapered rollers of such standard roller bearing, showing, in dotted lines, the manner in which the taper of such roller may be modified to secure the desired clearance angle; and Fig. 7 is an enlarged sectional detail view through the cone or inner bearing member of such standard tapered roller bearing, showing, in dotted lines, the manner in which the taper of the conical outside diameter of the cone may be modified to obtain the desired clearance angle.

The accompanying drawing illustrates part of a car truck comprising car wheels 1 mounted on an axle 2 that turns inside of a housing 3 upon the ends of which the side frames 4 are mounted. Interposed between each end of the axle and its housing is a roller bearing comprising a cone or inner raceway member 5 mounted on the journal portion of the axle, a conical cup or outer raceway member 6 seated in the ends of the housing and a circular series of taper rollers 7 between said raceway members, said rollers being spaced apart by a suitable cage 8. In the construction shown, a spacing ring 9 is mounted on each journal portion of the axle between the cone and the wheel, which spacing ring serves to hold said cone against a rib 10 provided therefor on the axle. The outer raceway member is held in position by a disk or annular plate 11 that is secured by cap screws 12 to the axle housing.

The construction thus far described is well known. In the old construction, however, the parts of the bearing were so related to one another that when the car was empty, the rollers would make line contact throughout their length with both the inner and the outer raceway members. The weight of the car is transmitted through the side frames to the axle housing and thence through the outer raceway member and uppermost roller or rollers and thence through the inner raceway member to the axle at a distance inwardly from its point of support by the car wheel. If the car is loaded heavily enough, the load thereof will cause a bowing or deflecting downwardly of the axle; and as the inner raceway member follows the axle, while the outer raceway member maintains its horizontal position in the housing, there is an appreciable cocking of the inner raceway member relative to the outer. The effect of this cocking on the old construction is to destroy the line contact that the uppermost roller or rollers make with the outer raceway member and which is best adapted to take care of heavy load, such line contact being converted into point contact only between the uppermost roller or rollers and said outer raceway, although such point contact is inferior to the line contact in resisting load. As the line contact is thus converted into point contact under heavy load, the rollers and raceway members wear rapidly when used on a shaft that is subject to deflection.

According to the present invention, when the inner and outer raceway members 5 and 6, respectively, are in true axial alinement, there is contact between the rollers 7 and one raceway member throughout the length of the roller but contact with the other raceway member at one end of the rollers only (see Figs. 1 and 2). When the expected load is applied and the shaft or axle is deflected thereby, the inner raceway member 5 becomes cocked relative to the outer raceway member 6, as above described; but the parts of the bearing are so proportioned that, in this cocked position, the uppermost roller will make line contact throughout its length with both the inner and the outer raceway members (see Figs. 3 and 4). As shown in Figs. 5, 6 and 7 of the accompanying drawings, the initial clearance required for this action may be obtained by modifying the cone angle of either cone 5a, the cup 6a or the rollers 7a of a standard roller bearing wherein there is line contact of the rollers throughout their length with both of the raceway members when said members are in axial alinement. As shown in Fig. 6, the rollers 7a of the standard bearing may be modified by increasing their taper either by increasing their larger diameter, as indicated by the dotted lines 7b, or by decreasing their smaller diameter, as indicated by the dotted lines 7c. Or such clearance may be afforded, as shown in Fig. 5, by making the cup with lower taper than the taper of the normal cup 6a, that is, by increasing the smaller inside diameter thereof, as indicated by the dotted line 6b, or by decreasing the larger diameter, as indicated by the dotted line 7c. Likewise, the required clearance may be obtained by increasing the taper of the standard cone or inner raceway member 5a shown in Fig. 7, as by making the small end of its conical bearing surface smaller, as indicated by the dotted line 5b, or by making the larger end of such surface larger, as indicated by the dotted line 5c. In all cases, the idea is to have the uppermost rollers contact throughout their length with both inner and outer raceways when the axle or shaft is deflected by its load; and for this purpose the initial clearance angle of the rollers should be substantially equal to the angle that the axis of the shaft or axle deflects under load from its unloaded position. By "clearance angle" is meant the angle, in the plane of the common axis of the two raceways and a roller, between an element of such roller and an element of the raceway with which said roller contacts at one end only.

In order to better withstand the wear due to the contact being limited to the end of the roller under light load, it is preferable to round off the end of such roller so as to locate the point of contact an appreciable distance inwardly from the overall or extreme end of the roller. In this arrangement, the point of contact is so strongly supported that chipping or spalling are not liable to occur under light load. Such point of contact is at the end of the bearing surface of the roller, and is regarded as the end of the roller in defining the position and length of contact.

In the design of axle illustrated, there are two roller bearings, one near each wheel; and they are arranged with their cones tapering outwardly. But this arrangement is typical only, as it is obvious that the invention is applicable to a single bearing only and to other arrangements. Likewise, while the drawing illustrates a conical roller bearing, the invention is applicable to cylindrical bearings by tapering one or another of the raceway members or the rollers to afford an initial clearance angle substantially equal to the angle of deflection of the shaft or the angle that the bearing cone cocks relative to the bearing cup.

What I claim is:

1. A roller bearing comprising inner and outer raceway members and a series of rollers between them, said rollers having contact throughout their length with one raceway and contact at only one end with the other raceway when said members are in axial alinement, the angle of clearance between the rollers and said last mentioned raceway being predetermined by the anticipated deflection of the axis of one member relative to the other.

2. The combination with a shaft of a roller bearing thereon consisting of inner and outer raceway members and rollers between them, said rollers having contact throughout their length with one of said raceways and at one end only with the other raceway when the raceways are in axial alinement, there being a clearance angle between said rollers and said last mentioned raceway substantially equal to the angle that said shaft is deflected under load.

3. A roller bearing comprising inner and outer raceway members and a series of roller members between them, said inner and outer raceway members and said roller members having conical bearing surfaces, the cone angle of the conical bearing surface of one of said members being different from the cone angle of the conical bearing surface of the member cooperating therewith whereby said rollers have contact throughout their length with one raceway member and contact at only one end with the other raceway member when said members are in axial alinement, the angle of clearance between the roller members and said last mentioned raceway member being predetermined by the anticipated deflection of the axis of one raceway member relative to the other raceway member.

4. The combination with a shaft of a roller bearing thereon consisting of an inner and outer raceway member and roller members between them, said inner and outer raceway members and said roller members having tapered bearing surfaces, the taper of the bearing surface of one of said members being different from the taper of the bearing surface of the bearing member cooperating therewith whereby said roller members have contact throughout their length with one of said raceway members and at one end only with the other raceway member when the raceway members are in axial alinement, the clearance angle obtained by the difference in the taper between the cooperating bearing surfaces of said roller members and said last mentioned raceway member being substantially equal to the angle that said shaft is deflected under load.

5. A roller bearing comprising inner and outer raceway members and a series of rollers between them, said rollers having contact at only one point with one of said raceways, when said raceways are in axial alinement, the angle of clearance between the rollers and said raceway being predetermined by the anticipated deflection of the axis of one member relative to the other.

6. A roller bearing comprising inner and outer raceway members and a series of roller members therebetween, said rollers being disposed to have a point contact with one of said raceway members and a line contact with the other raceway member when said bearing is free from load and to have line contact with both of said raceway members when said bearing is under load.

7. A roller bearing comprising inner and outer raceway members and a series of roller members therebetween, said rollers being disposed to have a point contact with the outer raceway member and a line contact with the inner raceway member when said bearing is free from load and to have line contact with said outer raceway member when said bearing is under load.

Signed at Canton, Ohio, this 3d day of Oct. 1928.

TRACY V. BUCKWALTER.